Dec. 8, 1931.  E. REIMANN  1,835,968

CONTROL SYSTEM FOR INDUCTION MACHINES

Filed Jan. 21, 1931

Inventor:
Erich Reimann,
by Charles A. Mullan
His Attorney.

Patented Dec. 8, 1931

1,835,968

UNITED STATES PATENT OFFICE

ERICH REIMANN, OF BERLIN-NEUKOLLN, GERMANY, ASSIGNOR TO GENERAL ELECTRIC COMPANY, A CORPORATION OF NEW YORK

CONTROL SYSTEM FOR INDUCTION MACHINES

Application filed January 21, 1931, Serial No. 510,295, and in Germany January 31, 1930.

My invention relates to control systems for induction machines in which the desired control is effected by a regulating machine concatenated with the wound secondary of the induction machine and the object of my invention is to provide improved means for supplying the exciting current required by the regulating machine.

I prefer first to describe my invention with the wound secondary induction machine operating as an induction motor and employed for stabilizing the voltage of an alternating current system that is subject to voltage variations and short circuits. When a short circuit occurs on an alternating current system its voltage may decrease to a fraction of the normal value because the exciting current of the generator supplying the system is unable to maintain normal voltage during the short circuit period. In some cases it is desirable to have the system voltage decrease considerably during the short circuit period because it decreases the current flowing through the short circuit path. In many cases, however, especially when the short circuit is only of a transient nature, it is desirable to maintain the system voltage during the short circuit period at a fairly high value in comparison to its normal value in order to prevent the falling out of step of synchronous motors connected to the system. To maintain this fairly high voltage during the short circuit period by the use of an induction motor connected to the system necessitates that the latter draw large leading currents from the system during this short circuit period since the leading currents act as exciting current for the system generators. It is well known to those skilled in the art that by suitably exciting a regulating machine concatenated with the wound secondary of an induction motor having its primary winding connected to the system, the motor will draw wattless leading current from the system. If, however, the regulating machine is energized directly or indirectly from the source in the manner heretofore practiced, namely energized by an exciting current whose value decreases when the system voltage decreases, then during the short circuit period the exciting current and hence the leading current flowing into the motor primary winding decreases to a fraction of their normal value and the induction motor can not maintain a fairly high value of system voltage. It is undesirable to employ mechanical regulators for automatically increasing the exciting current in the regulating machine during the short circuit period because the inertia of the regulators make them ineffective during transient short circuits. My invention makes it possible for the induction motor to maintain a fairly high system voltage during a short circuit period by providing means adapted to be automatically energized from the source with increasing magnitudes of wattless leading current when the system voltage decreases and making the exciting current in the regulating machine proportional to this wattless leading current.

My invention will, however, be best understood from the following description when considered in connection with the accompanying drawings while the features of my invention which are believed to be novel and patentable are pointed out in the appended claims.

Figure 1:
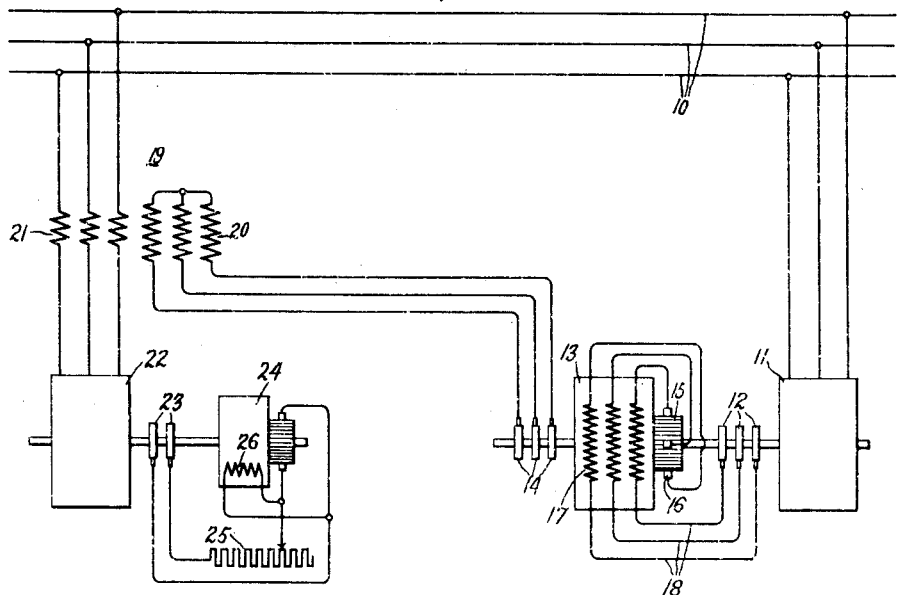
Fig. 1 represents a preferred embodiment of my invention in which the regulating machine is represented as a commutator type frequency changer receiving its exciting current from the secondary winding of a current transformer whose primary winding is in series with the primary winding of a synchronous motor connected to the alternating current system.

In Fig. 1, 10 represents a three-phase alternating-current source and 11 represents a wound secondary induction motor having its primary winding connected to the source 10. The motor 11 is preferably shown with a rotating wound secondary connected to collector rings 12. The regulating machine for the motor 11 is a commutator type frequency changer represented by 13. The machine 13 has a rotatable member provided with a primary exciting winding connected to collector rings 14 and a commutated winding connected to a commutator 15 on which rest brushes 16. The machine 13 is preferably shown with stationary compensating windings 17 connected in series with leads 18, the latter serving to connect the brushes 16 to collector rings 12. The exciting current for the primary winding of the frequency changer 13 is obtained from a current transformer 19 whose secondary windings 20 are connected to rings 14 and whose primary windings 21 are connected to the source 10 in series with the primary winding of a small synchronous motor represented by 22. The motor 22 is preferably shown as having a rotating field winding connected to collector rings 23, this field winding being energized from a direct current generator 24 in series with an adjustable resistance 25. The generator 24 is driven by the motor 22 and has a shunt connected exciting winding 26. The frequency changer 13 has the same number of poles as the motor 11 and is driven by the latter and therefore the voltage at the brushes 16 of machine 13 has the slip frequency of the induction motor 11.

Assume the source 10 has an inductive load and it is desired to stabilize the voltage of the source 10 in the vicinity where it is connected to the motor 11. The resistance 25 is adjusted to overexcite the synchronous motor 22 and the latter draws from the source 10 a wattless leading current which necessarily flows through the primary winding 21 of the transformer 19. This causes a leading current to flow through the primary exciting winding of the frequency changer 13 and the latter generates slip frequency voltage at its brushes 16, the value of this voltage being substantially proportional to the current flowing into the motor 22 from the source 10. By suitably connecting the leads 18 to the rings 12 the slip frequency voltage may be injected into the wound secondary of the motor 11 so that the primary winding of the latter draws wattless leading current from the source 10. The excitation supplied to the field winding of the motor 22 is independent of voltage variations of the source 10 and it is obvious that if the voltage of 10 decreases from its normal value because of a change in the line drop or a change in the voltage of the generator supplying the source 10, the wattless leading current flowing into the motor 22 will increase, thus causing an increase in the wattless leading current flowing into the motor 11. The increase in the wattless leading currents maintains the voltage of the source 10 at a value which is higher than it would have without this increase in leading current. It is clear that if the above-mentioned reasons cause the voltage of 10 to increase above what would be its normal value when the line drop increases or the voltage of the system generator decreases, then there will be a decrease in the wattless leading current flowing into the motor 11 when the line drop decreases or the voltage of the system generator increases, and the voltage of the source 10 will be maintained at a value which is lower than it would have without this decrease in leading current. By suitably proportioning the current transformer and the various machines shown, it is possible to keep the voltage variations of the source 10 within small limits. This result is mostly due to the change in the leading current taken by the induction motor 11 since it is obvious that the object of the motor 22 is to cause this change in leading current and although the direct effect on the voltage of the source 10 caused by the change in leading current taken by the motor 22 is beneficial, this direct effect is small compared with that produced by 11 because the capacity of 22 is small compared with that of 11. It is clear that if a short-circuit occurs on the source 10 or on its load system the voltage will tend to decrease considerably below its normal value, thus causing the motors 11 and 22 to draw large values of leading current which operates to maintain the voltage of the source 10 at a fairly high value in comparison to its normal value.

It is sometimes desirable to stabilize the voltage of the source 10 when the net result of its load and line charging current cause it to have a leading current, this condition occurring when 10 is a long transmission system having considerable reactance and a high charging current. The arrangement forming my invention is so flexible that without a change in structure it is also able to stabilize the voltage of the source 10 under these conditions. Assuming the existence of these conditions, the resistance 25 is adjusted to underexcite the motor 22, thus causing the latter to draw from the source 10 a wattless lagging current and consequently a wattless lagging current flows into the primary winding of the motor 11. If for reasons previously described the voltage of the source 10 changes from its normal value, there will be a corresponding change in the lagging currents flowing in the motors 11 and 22. By suitably adjusting the resistance 25 to obtain the proper change in lagging currents, it is possible to keep the voltage variations of the source 10 within small limits and in the event of a short-circuit it is possible to maintain the voltage reasonably near its normal value. It is clear that the generator 24 and the resistance 25 permit selective operation of the motor 22 so that the latter draws increasing leading current when the voltage of the source 10 decreases and vice versa, or draws decreasing lagging current when the voltage of 10 decreases and vice versa, and this selective operation permits my arrangement to stabilize the voltage of the source 10 under all operating conditions.

Figure 2:
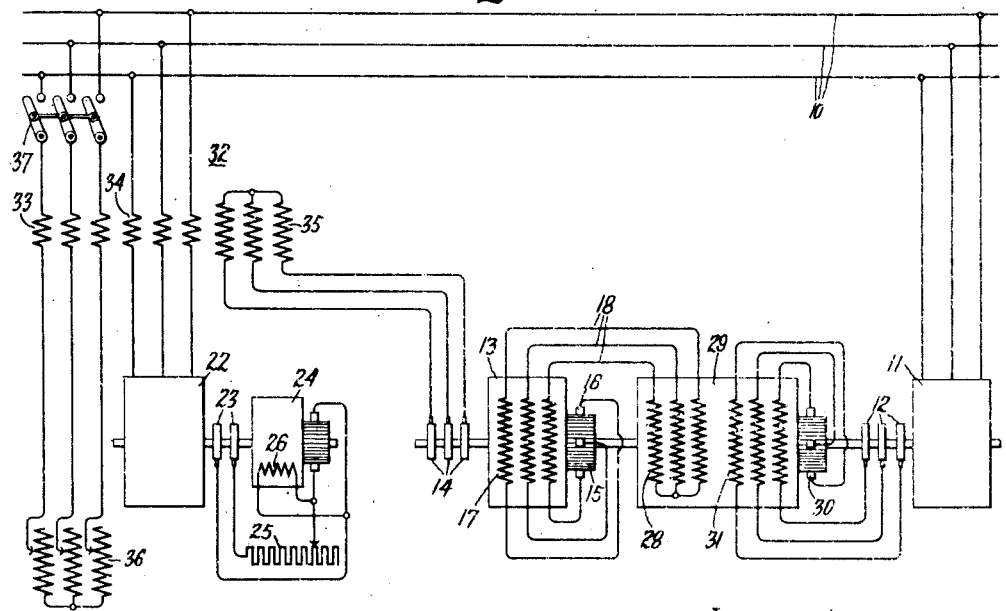
Fig. 2 represents a modification of the invention in which the frequency changer supplies exciting current to a commutator type machine which functions as the regulating machine and the current transformer is provided with an additional primary winding connected in series with inductances to the alternating current system.

In Fig. 2 similar parts to those in Fig. 1 are represented by the same numbers. In Fig. 2 the frequency changer 13 is used for supplying current to exciting windings 28 placed in a commutator type regulating machine 29 driven by the motor 11. The machine 29 has brushes 30 resting on its commutator and these brushes are connected in series with a stationary compensating winding 31 to the collector rings 12 of the induction motor 11. A current transformer 32 has two primary windings 33 and 34 respectively and one secondary winding 35. The primary winding 33 is connected in series with adjustable inductances 36 and a switch 37 to the source 10. The primary winding 34 is connected in series with the primary winding of the synchronous motor 22 and the secondary winding 35 is connected to the collector rings 14 of the frequency changer 13.

The machine 29 is employed in order to reduce the size and cost of the frequency changer 13 and the machines 22 and 24. It will be clear that with the switch 37 open the arrangement in Fig. 2 will operate in the same manner as the arrangement in Fig. 1. With the switch 37 open the arrangement shown in Fig. 2 will operate satisfactorily to give voltage stabilization under practically all operating conditions of the source 10. There may, however, arise the occasional condition where the source 10 operates with very large values of leading current, making it necessary to operate the synchronous motor 22 with such a weak field exciting current that there is the possibility of the motor 22 falling out of step. This can be easily avoided by providing an abnormal air gap between the field and primary windings of the motor 22 or by closing the switch 37 and using both primary windings of the current transformer 32 arranged in either of the following ways: First, the current transformer primary windings 33 and 34 are arranged to produce opposing magnetomotive forces. The inductances 36 are then adjusted so that the vector sum of the currents in 33 and 34 produce in the transformer 32 a flux which results in the correct current flowing in the transformer secondary 35 for the assumed condition, thereby producing sufficient exciting current to operate the motor 22 in a stable manner. Second, the primary windings 33 and 34 are arranged so that their magnetomotive forces assist each other when 22 is underexcited. The inductances 36 are then adjusted so that it is necessary to operate 22 overexcited by suitably adjusting 25 in order that the vector sum of the currents in 33 and 34, which now produce opposing magnetomotive forces since their currents are 180 degrees out of phase, will produce in the transformer 32 a flux which results in the flow of the correct current in the transformer secondary 35 for the assumed condition. Stable operation of 22 may therefore be obtained by employing either of the three above-described measures.

I will now describe how my invention may be used for speed and load control of the induction motor 11. Referring to Fig. 1, for example, assume that the induction motor 11 is driving the usual type of load and it is desired to vary its speed with or without power factor control. The connections from the current transformer secondary 20 to the collector rings 14 or the connections from the leads 18 to the rings 12 may be so made that the voltage injected into the secondary winding of the motor 11 will affect the speed and also the power factor, if so desired, of the motor 11. By varying the resistance 25 the speed and also the power factor, when desired, of the motor 11 may be controlled. It is obvious that if the induction motor 11 is one element of a frequency converter set it is possible by adjusting the resistance 25 to control the interchange of energy current between two alternating current sources, or to control the flow of wattless current in the source connected to the induction motor, or to control both simultaneously.

For controlling the speed or load of the motor 11, one form of the regulating sets as heretofore constructed (see for example U. S. Patents 1,590,065 and 1,693,296) employs a synchronous motor driving a synchronous generator which supplies the exciting current to the primary winding of the frequency changer and fine regulation of speed or load is obtained by regulating a resistance in series with the field of the synchronous generator. My invention retains the advantage of fine regulation and provides a regulating set which is lower in first cost and more economical to operate since I employ only one synchronous machine and an inexpensive current transformer, thus doing away with one synchronous machine and the apparatus necessarily attached to the synchronous machine.

In accordance with the provisions of the patent statutes, I have described the principle of operation of my invention, together with the apparatus which I now consider to represent the best embodiment thereof, but I desire to have it understood that the apparatus shown and described is only illustrative, and that the invention may be carried out by other means.

What I claim as new and desire to secure by Letters Patent of the United States, is,—

1. Apparatus for stabilizing the voltage of an alternating current source subject to voltage variations, said apparatus comprising a wound secondary induction machine having its primary winding connected to said source, means energized by said source, adjustable means associated with the first-mentioned means for selectively causing the first-mentioned means to be energized with increasing magnitudes of wattless leading current with decreasing voltage of said source and vice versa with a given adjustment of said adjusting means and to be energized with decreasing magnitudes of wattless lagging current with decreasing voltage of said source and vice versa with a different adjustment of said adjusting means, means responsive to the current supplied by said source to said first-mentioned means for producing a voltage whose frequency equals the slip frequency of the induction machine and whose magnitude is substantially directly proportional to the magnitude of said last-mentioned current, and connecting means between the slip frequency voltage producing means and the wound secondary for injecting into the latter the slip frequency voltage in such a manner as to cause a flow of wattless current in the induction machine primary winding.

2. Apparatus for stabilizing the voltage of an alternating current source subject to voltage variations, said apparatus comprising a wound secondary induction machine having its primary winding connected to said source, means adapted to be energized from said source with increasing magnitudes of wattless leading current with decreasing voltages of said source, means responsive to the current supplied by said source to said first-mentioned means for producing a voltage whose frequency equals the slip frequency of the induction machine and whose magnitude is substantially directly proportional to the magnitude of said last-mentioned current, and connecting means between the slip frequency voltage producing means and the wound secondary for injecting into the latter the slip frequency voltage in such a manner as to cause a flow of wattless leading current in the induction machine primary winding.

3. Apparatus for stabilizing the voltage of an alternating current source subject to voltage variations, said apparatus comprising a wound secondary induction machine having its primary winding connected to said source, means adapted to be energized from said source with a wattless lagging current, means adapted to be energized from said source with increasing magnitudes of wattless leading current with decreasing voltages of said source, means responsive to the currents supplied by said source to the two first-mentioned means for producing a voltage whose frequency equals the slip frequency of the induction machine and whose magnitude is substantially directly proportional to the vector sum of said last-mentioned currents, and connecting means between the slip frequency voltage producing means and the wound secondary for injecting into the latter the slip frequency voltage in such a manner as to cause a flow of wattless lagging current in the induction machine primary winding.

4. Apparatus for stabilizing the voltage of an alternating current source subject to voltage variations, said apparatus comprising a wound secondary induction machine having its primary winding connected to said source, means energized from said source with a wattless current, additional means energized from said source, adjustable means associated with the additional means for selectively causing the additional means to be energized with increasing magnitudes of wattless leading current with decreasing voltage of said source and vice versa with a given adjustment of said adjusting means and to be energized with decreasing magnitudes of wattless lagging current with decreasing voltage of said source and vice versa with a different adjustment of said adjusting means, means responsive to the currents supplied by said source to the two first-mentioned means for producing a voltage whose frequency equals the slip frequency of the induction machine and whose magnitude is substantially directly proportional to the vector sum of said last-mentioned currents, and connecting means between the slip frequency voltage producing means and the wound secondary for injecting into the latter the slip frequency voltage in such a manner as to cause a flow of wattless current to the induction machine primary winding.

5. In combination, a source of alternating current, a wound secondary induction machine and a synchronous machine having their primary windings connected to said source, an exciting winding for said synchronous machine, means for energizing said exciting winding, means responsive to the current flowing in the synchronous machine primary winding for producing a voltage whose frequency equals the slip frequency of the induction machine and whose magnitude is substantially directly proportional to the magnitude of said last-mentioned current, and connecting means between the slip frequency voltage producing means and the wound secondary for impressing on the latter said slip frequency voltage.

6. In combination, a source of alternating current, a wound secondary induction machine and a synchronous machine having their primary windings connected to said source, an exciting winding for said synchronous machine, means for energizing said exciting winding, a current transformer having its primary winding in series with the synchronous machine primary winding, a secondary winding for said transformer, means responsive to the current flowing in the transformer secondary winding for producing a voltage whose frequency equals the slip frequency of the induction machine and whose magnitude is substantially directly proportional to the magnitude of said last-mentioned current, and connecting means between the slip frequency voltage producing means and said wound secondary for impressing on the latter said slip frequency voltage.

7. In combination, a source of alternating current, a wound secondary induction machine and a synchronous machine having their primary windings connected to said source, an exciting winding for said synchronous machine, means for energizing said exciting winding, a rotating commutator type regulating machine concatenated with the wound secondary, an exciting winding for said regulating machine, a commutator type frequency changer provided with collector rings, connecting means between the frequency changer commutator and the last-mentioned exciting winding, a current transformer having its primary winding in series with the synchronous machine primary winding and its secondary winding connected to said collector rings, and means for driving the frequency changer so that the voltage at its commutator has the slip frequency of the induction machine.

8. In combination, a source of alternating current, a wound secondary induction machine and a synchronous machine having their primary windings connected to said source, an exciting winding in said synchronous machine, means for energizing said exciting winding, inductance coils connected to said source, a current transformer having one primary winding in series with said inductances and another primary winding in series with the synchronous machine primary winding, a secondary winding for said current transformer, means responsive to the current flowing in the transformer secondary winding for producing a voltage whose frequency equals the slip frequency of the induction machine and whose magnitude is substantially directly proportional to the magnitude of said last-mentioned current, and connecting means between the slip frequency voltage producing means and said wound secondary for impressing on the latter said slip frequency voltage.

In witness whereof, I have hereunto set my hand this 9th day of January, 1931.

ERICH REIMANN.